June 17, 1924.
H. A. WOOFTER
1,498,222
METHOD OF HEATING VULCANIZERS
Filed Dec. 8, 1919
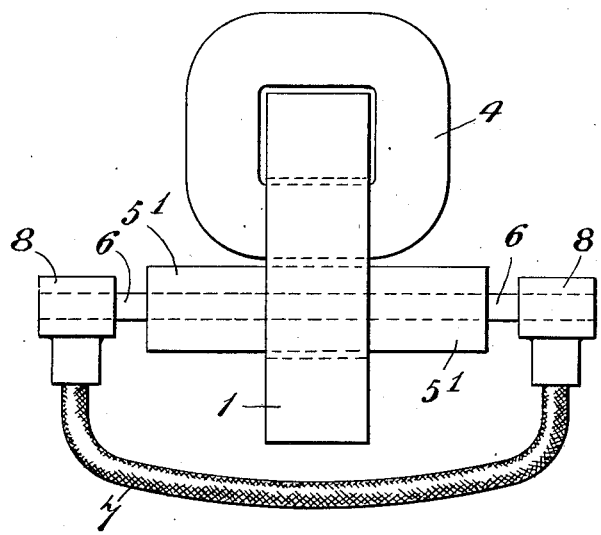
Inventor
Herbert Addison Woofter
By his Attorneys
Townsend & Decker Patented June 17, 1924.

1,498,222

UNITED STATES PATENT OFFICE.

HERBERT ADDISON WOOFTER, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

METHOD OF HEATING VULCANIZERS.

Application filed December 8, 1919. Serial No. 343,191.

*To all whom it may concern:*

Be it known that I, HERBERT ADDISON WOOFTER, a citizen of the United States, and a resident of Swampscott, in the county of Essex and State of Massachusetts, have invented certain new and useful Improvements in Methods of Heating Vulcanizers, of which the following is a specification.

My invention relates to a method of and apparatus for vulcanizing objects of vulcanizable material by the heating effect of an electric current.

The invention relates more particularly to the vulcanization of articles in short lengths such as hollow handles or short tubes or of any other objects which, as distinguished from an automobile tire for instance, are dis-continuous instead of being continuous or endless in form.

The purpose of the invention is specially to permit the operations to be carried on upon the objects one after the other without the necessity of changing or interfering with the construction of the electrical device such as a transformer from which the heating, vulcanizing current is derived, as for instance by removal of a section of the core of the transformer to permit the vulcanizer core and mold bearing the endless tire or other endless object to be placed in the transformer in the position or relation of a secondary thereof.

In the accompanying drawings I show in diagrammatic or skeleton fashion an apparatus suitable for the practice of my invention and as applied to the vulcanization of handles, short tubes, etc.

4 indicates the primary of a transformer of the general type usually constructed to step down the applied current and furnish a heavy heating current by its secondary, while 1 indicates the usual core for said transformer. 5' indicates a short tube or handle to be vulcanized and 6 indicates a vulcanizing core of good conducting material upon which the tube is mounted. The external mold, also of metal, which is usually employed as a part of the vulcanizer proper, is not shown, but if used may be heated by the use of appliances the same as those herein described.

7 indicates an external cable or jumper of copper or other good conducting material and of heavy gage adapted to carry readily the heating current. Said cable or jumper is provided with clamp terminals 8 adapted to be secured or applied to the ends of the portion 6 of the vulcanizer so that the core 6, the cable or jumper and the terminals or connections between the same and the core will form a closed electrical circuit adapted to carry heating currents generated in any portion of said circuit.

In the preferred manner of practicing my invention the vulcanizer proper with the vulcanizable material or object thereon is first inserted in position in the core of the transformer so that it may be the seat of induced currents generated by the magnetic field and the terminals 8 of the short length of cable or jumper 7 are applied to and securely fastened in electrical connection with the ends of the core 6. The heating current generated in the core 6 and flowing in closed circuit therethrough and through the jumper 7 by way of its terminals, supplies the necessary vulcanizing heat. After vulcanization one or both of the terminals 8 are detached and the vulcanizer with the applied object 5 are removed which, as will be seen, may be readily done without opening or dividing the core circuit of the transformer. Another object to be vulcanized and in place upon the vulcanizer core or mold may be then inserted in position. After application of the jumper terminals to the ends of the core, the operation may be repeated.

Obviously the invention may be practiced in connection with vulcanizing objects of other shapes but which, like the short tubes shown, are dis-continuous, the metal of the vulcanizer in such cases being included in the heating electric circuit formed by the vulcanizer and of a jumper with terminals attached to the vulcanizer proper, the said circuit being made the seat of currents generated in a magnetic field after completion of the circuit by attachment of the jumper terminals to the vulcanizer.

Obviously, therefore, my invention is not limited to any particular form of rubber article or to any particular shape or form of vulcanizer. It is preferable to use a hollow core as the seat of the generated and heating currents, but my invention is not limited to the use of a hollow section or vulcanizer nor to any particular material employed therefor.

I do not limit myself to the use of any particular electrical device as a means for furnishing the magnetic field by which the current is generated in the parts of the vulcanizer but prefer, for the sake of convenience, to use an ordinary step-down or heating transformer, such as in its essential electrical character, answers to the ordinary welding or riveting transformer.

What I claim as my invention is:—

The combination with a vulcanizer acting as a portion of the secondary of a heating transformer and thereby becoming the path of a heating electric current, of a conducting cable or jumper having terminals adapted to be secured to terminals of the vulcanizer.

Signed at Lynn, in the county of Essex and State of Mass., this 5th day of December, A. D. 1919.

HERBERT ADDISON WOOFTER.

Witnesses:
RUTH L. TILTON,
LATETIA CRILLEY.